APPARATUS PROVIDING ALTERABLE SYMBOLIC MEMORY ADDRESSING
IN A MULTIPROGRAMMED DATA PROCESSING SYSTEM
Filed April 18, 1966
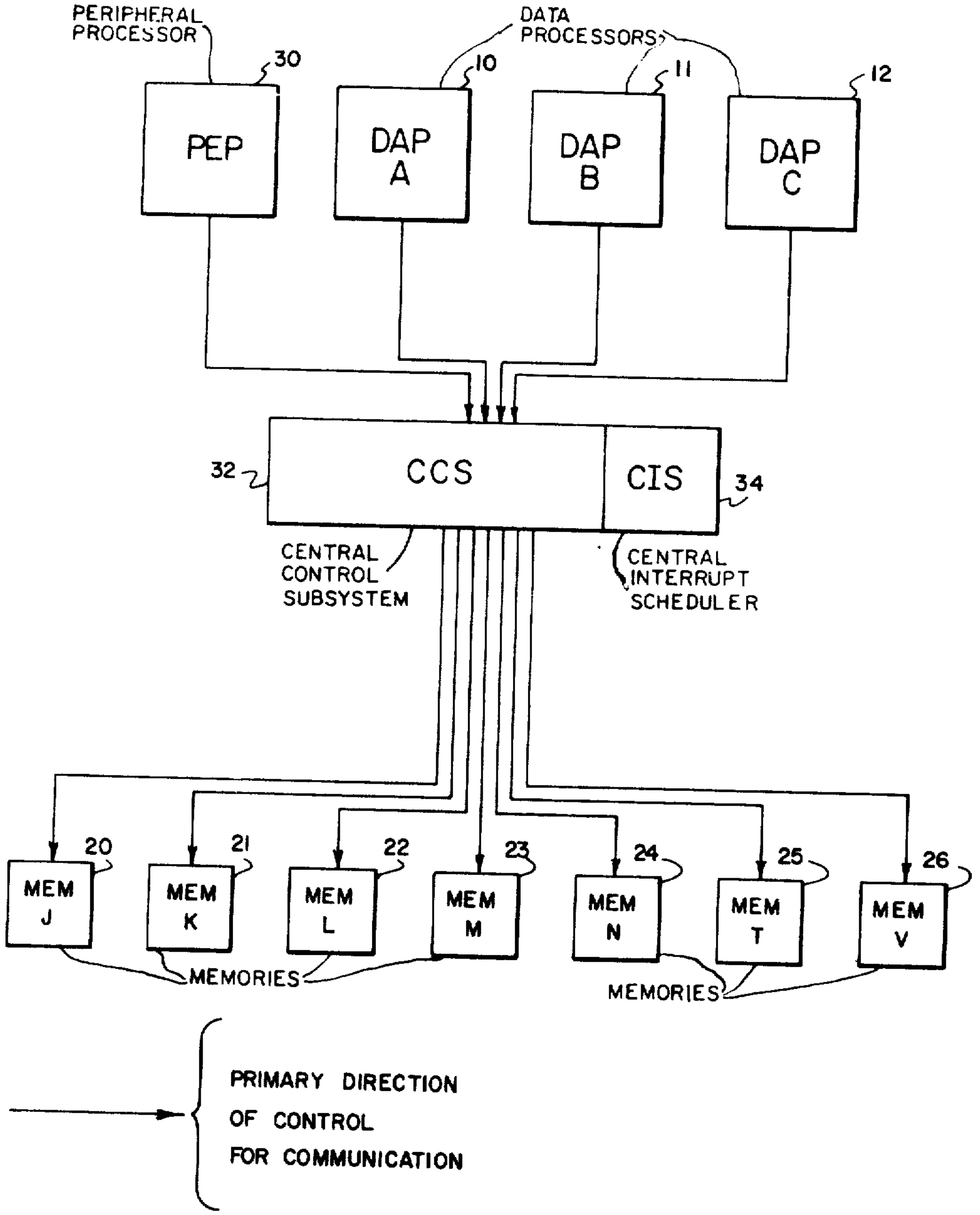
*INVENTORS*
J. P. BARLOW
A. McLAGAN
L. L. RAKOCZI
M. A. TORFEH
*BY*

United States Patent Office 3,505,647

Patented Apr. 7, 1970

3,505,647

APPARATUS PROVIDING ALTERABLE SYMBOLIC MEMORY ADDRESSING IN A MULTIPROGRAMMED DATA PROCESSING SYSTEM

Mark A. Torfeh, Tarzana, Calif., Laszlo L. Rakoczi, Phoenix, Ariz., and Angus McLagan, Venice, and Jesse P. Barlow, Reseda, Calif., assignors to General Electric Company, a corporation of New York Filed Apr. 18, 1966, Ser. No. 543,237
Int. Cl. G06f *1/00, 7/00, 15/00*
U.S. Cl. 340—172.5 13 Claims

ABSTRACT OF THE DISCLOSURE

A multiprogrammed data processing system is disclosed in which each program stored in the storage member is written using symbolic addresses, i.e. the block address and word address of the cells in which each data word is stored are relative to a predetermined reference address common to all programs. Whenever a data processor is to communicate with the storage subsystem it furnishes signals representing the program, the symbolic block address and the word address of the data word to be transferred. The symbolic block address and program signals are translated by an address translating device into an actual block address of the storage member. The actual block address and the word address are applied to the storage member and uniquely identify one cell of the storage member in which the data word is stored or to be stored. The address translating device produces an actual block address based on the assignment of memory cells to each program when that program is stored in the memory. This assignment; i.e. the topological relationship between the program and the memory cells assigned to the program, varies as the programs in the memory are changed.

This invention relates to multicomputer and multiprogrammed systems and more particularly to apparatus for exercising management control of a multicomputer or multiprogrammed data processing system.

The multicomputer system is a data processing system comprising a plurality of data processing units, one or more data storage units, and a plurality of input devices and output devices. The data processing units process data by executing separate programs simultaneously and independently of each other. The data storage units store data to be processed, data which is the result of processing, and programs for controlling the processing operations of the data processing units. The input devices supply programs and data to be processed and the output devices receive and utilize processed data.

The multiprogrammed system is a data processing system wherein one or more data storage units store concurrently a plurality of independent programs or portions of such programs. A multiprogrammed system having but one data processing unit alternately executes the stored programs. The multicomputer system functions as a multiprogrammed system, wherein the plural data processing units simultaneously execute respective ones of the plural stored programs.

Communication must be provided within the data processing systems described to transfer programs and data to be processed from the data storage units to the data processing units and to transfer processed data from the data processing units to the data storage units. Communication must also be provided to transfer programs and data to be processed from the input devices to the data storage units and to transfer processed data from the data storage units to the output devices.

The apparatus of the instant invention provides management control for such multicomputer or multiprogrammed systems. Generally, management control of the multicomputer system described comprises expeditiously supplying data to be processed and the programs providing the required data processing functions to the data processing units, and efficiently controlling the output devices to receive and utilize the processed data. This management control is effected by providing and controlling all required communications between data processing units and data storage units and between input and output devices and data storage units; by providing for the assignment of programs to data processing units for execution in accordance with the required urgencies for execution of the different programs, the availability of the required input and output devices, the availability of the required data storage space in the data storage units, and the relative capabilities of the data processing units for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the data processing units, or when the data processing units become partially or totally inoperative; etc.

Each data processing unit of a multicomputer or multiprogrammed system executes a program independently of the other stored programs. The program comprises a set of instructions, each instruction specifying a discrete type of processing operation. A data processing unit executes a program by sequentially responding to each of the instructions of the program to perform the corresponding operations. The data processing unit obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processing unit supplies the corresponding addresses in sequence. Additionally, many of the instructions during execution require the data processing unit to further communicate with the data storage system, either to obtain a data item on which the data processing unit is to perform an operation or to store a data item which is the result of an operation. Accordingly, each instruction requiring a transfer of a data item between the data processing unit and the data storage system must also identify the cell which is to supply or receive the data item. Therefore, each program requires a set of cells for storing and supplying data items to be processed by the program, for receiving and storing data items which are the result of processing operations performed by the program, and for storing the instructons of the program, many of the stored instructions comprising an identification of a cell in the set.

A program is only executed by the multicomputer or multiprogrammed system after it has been presented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processing unit must employ in sequence symbolic identifications, or symbolic addresses, of cells appropriately disposed relative to the cells identified by the symbolic addresses provided by the instructions. Additionally, the symbolic addresses supplied by a data processing unit during execution of a program will identify symbolically a contiguous set of data storage system cells within which the instructions, the data items to be processed, and the processed data items are stored or to be stored.

The copending U.S. patent application Ser. No. 508,168 of J. P. Barlow, R. Barton, J. E. Belt, C. R. Frasier, L. A. Hittel, L. L. Rakoczi, M. A. Torfeh, and J. B. Wiener for Apparatus Providing Symbolic Memory Addressing In a Multicomputer System, filed Nov. 16, 1965, and assigned to the assignee of the instant invention, describes and claims an invention providing an advanced form of management control apparatus for a multicomputer or multiprogrammed system. The management control apparatus of the aforementioned patent application provides for simply, reliably and rapidly converting the symbolic identifications of the storage cells supplied by the programs and the data processing units into corresponding actual addresses of the storage cells in which the instructions of the program, the data items to be processed, and the processed data items are stored or to be stored. The management control apparatus comprises an address translator coupled to the data processing units for receiving each symbolic address as it is presented when a data processing unit is to communicate with the system of data storage units. Upon receiving each symbolic address the translator responds to generate a unique actual address which represents a specific cell in a specific data storage unit. Thus, the address translator employed in the aforementioned invention enables a plurality of programs employing similar series of symbolic addresses to communicate with unique portions of the data storage system for execution.

In a multiprogrammed system it is desirable to provide different sets of concurrently stored programs. It is desirable to provide freedom in independently supplying different mixes of programs for storage in the data storage system prior to execution. For example, a relatively large number of relatively small programs may comprise such a mix, or a relatively small number of relatively large programs may be provided. It is desirable, therefore, in order to enable flexibility for the execution of different sets of programs, to provide apparatus for converting each of the corresponding sets of symbolic identifications of storage cells into respective sets of actual addresses of the cells of the storage system.

Therefore, it is an object of this invention to provide improved management control apparatus for implementing the effective and efficient execution of the programs in multicomputer and multiprogrammed systems.

Another object of this invention is to provide apparatus for enabling improved communication between a data storage system and a data processing unit which symbolically identifies locations in the data storage system.

Another object of this invention is to provide a multiprogrammed system wherein the programs of different program sets identify symbolically the cells of the data storage system.

Another object of this invention is to provide a multiprogrammed system wherein the instructions of different program sets symbolically identify the cells of the data storage system.

Another object of this invention is to provide apparatus for enabling all of the multiple programs of each of a plurality of program sets of a multiprogrammed system to occupy concurrently the data storage system.

The foregoing objects are achieved, according to one embodiment of the instant invention, by providing a data processing system wherein a series of symbolic data storage system identifications, which represent the addresses of a corresponding series of contiguously addressable data storage cells, supplied by a data processing unit during execution of each program of a particular program set are applied to a translating apparatus, and wherein the translating apparatus, which comprises an organization providing a particular topological relationship between the storage cells and all of the symbolic addresses supplied during execution of the program set, translates the symbolic series to a series of actual designations of cells in the data storage system. A data transmission member provides selective and controllable communication between the one or more data processing units and the one or more data storage units of the data processing system. When a data processing unit is to communicate with the data storage system to receive an instruction, to receive a data item to be processed or to transmit a processed data item, the data processing unit supplies a first signal group symbolically representing the address of a cell in the data storage system. An address translating device is coupled to the data processing units for receiving these symbolic addresses. Upon receiving each symbolic address the address translating device responds to generate a corresponding second signal group which represents a specific cell in a specific data storage unit, the second signal group being generated in accordance with a particular topological relationship provided by the translating device for the program set being executed.

Following generation of a second signal group by the address translating device, additional apparatus provides transfer of the second signal group to the data storage system. Upon receiving the actual address represented by a second signal group, a data storage unit initiates an operation to provide the required communication between the specifically addressed cell thereof and the initiating data processing unit through the data transmission member.

When a different program set is to be executed by the data processing system, the topological relationship of the address translating device is altered to provide a corresponding relationship between the storage cells and the symbolic addresses supplied during execution of the new program set.

Certain portions of the apparatus herein disclosed are not of our invention, but are the inventions of:

W. J. Broderick, C. R. Frasier, L. A. Hittel, G. R. Hope, Jr., E. J. Porcelli, and L. L. Rakoczi, as defined by the claims of their application, Ser. No. 544,023, filed Apr. 20, 1966;

R. Barton, L. A. Hittel, L. L. Rakoczi, and J. B. Wiener, as defined by the claims of their application, Ser. No. 546,716, filed May 2, 1966;

C. R. Frasier, L. A. Hittel, J. R. Hudson, L. L. Rakoczi, D. L. Sansbury and J. B. Wiener, as defined by the claims of their application, Ser. No. 550,037, filed May 13, 1966;

J. P. Barlow, S. F. Aranyi, L. L. Rakoczi, and M. A. Torfeh, as defined by the claims of their application, Ser. No. 550,562, filed May 16, 1966;

J. E. Belt, L. A. Hittel, G. R. Hope, Jr., E. J. Porcelli, and L. L. Rakoczi, as defined by the claims of their application, Ser. No. 551,355, filed May 19, 1966;

S. F. Aranyi, J. P. Barlow, R. Barton, L. L. Rakoczi, and M. A. Torfeh, as defined by the claims of their application, Ser. No. 551,657, filed May 20, 1966;

J. P. Barlow, C. R. Jones, and J. L. Kerr, as defined by the claims of their application, Ser. No. 559,305, filed June 21, 1966;

W. W. Chu and N. R. Crain, as defined by the claims of their application, Ser. No. 559,497, filed June 22, 1966; S. F. Aranyi, J. P. Barlow, E. J. Porcelli, L. L. Rakoczi, and M. A. Torfeh, as defined by the claims of their application, Ser. No. 568,343, filed July 27, 1966;

J. E. Belt, L. A. Hittel, and L. L. Rakoczi, as defined by the claims of their application, Ser. No. 612,560, filed Jan. 30, 1967;

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1967;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,-504, filed on June 16, 1967; all such applications being assigned to the assignee of the present application.

DESCRIPTION OF THE DRAWINGS

The invention will be described with reference to the accompanying drawings, wherein:

FIGURE 1 is a block diagram of a Multicomputer Data Processing System to which the instant invention is applicable.

For a complete description of FIGURE 1 and of our invention, reference is made to U.S. Patent No. 3,444,525 entitled "Centrally Controlled Multicomputer System" by Jesse P. Barlow et al., which is assigned to the assignee of the present invention. More particularly, attention is directed to FIGURES 2–110 of the drawings and to the specification beginning at column 8, line 4, and ending at column 173, line 9, inclusive, of U.S. Patent No. 3,444,525 which are incorporated herein by reference and made a part hereof as if fully set forth herein.

What is claimed is:

1. A data processing system comprising: a data processing unit; a data storage member, said data storage member adapted to store data words of at least one portion of one program in the addressable storage cells thereof, the data words of each of said portions of programs having symbolic addresses, each symbolic address representing the location of a cell in said storage member relative to a common predetermined reference address; a data word transmission member coupling said processing unit with said data storage member; the processing unit being adapted to receive data words from said transmission member, to execute a plurality of different operations on received data words, to transfer data words representing the results of said operation to said data storage member by said transmission members, and to assign a set of storage cells of said data storage member to each portion of a program to be stored in said storage member, means for storing in said storage member portions of programs in the set of cells assigned thereto, the portions of programs stored in the data storage systems varying as a function of time; each portion of a program stored in the storage member having an identifier symbol, so that for each identifier symbol and symbolic address there is a corresponding addressable storage cell; the processing unit supplying an identifier signal and a first signal group representing respectively the identifier symbol and the symbolic address of a data word of a program portion stored in said data storage means when a data word is to be transferred between the processing unit and the storage member; the storage member responsive to a second signal group representing the actual address of a storage cell of the data storage member for transferring a data word between said cell and said transmission member; an address translating device coupled to said processing unit to receive said identifier signal and said first signal group and responsive thereto for generating the corresponding second signal group; and means for delivering said second signal group to said storage member.

2. A data processing system comprising: a data processing unit; a data storage member, said data storage member adapted to store data words of portions of programs in the addressable storage cells thereof, the data words of each portion having symbolic addresses, each symbolic address representing the location of a cell in said storage member relative to a common reference address; a data word transmission member coupling said processing unit with said data storage member; said processing unit adapted to receive data words from said transmission member, to execute a plurality of different operations on received data words, and to transfer data words representing the results of said operations to said data storage member by said transmission member; means for storing portions of programs in said storage member; each of said portions being stored in a unique set of storage cells of said data storage member whereby, as program portions are replaced by other program portions, the program portions stored in said data storage member vary; each portion of a program stored in the storage member having an identifier, so that for each identifier and symbolic address of a program stored in said storage member there is a corresponding unique storage cell in said data storage member; said processing unit supplying the identifier signal representing the program identifier and the first signal group representing the symbolic address of a data word when said processing unit is to transfer a data word between said processing unit and the corresponding cell of said storage member; said storage member responsive to a second signal group representing the actual address of a storage cell for transferring a data word between said cell and said transmission member; an address translating device coupled to said processing unit to receive said identifier signal and said first signal group and responsive thereto for generating the corresponding second signal group; and means for delivering said second signal group to said storage member.

3. A data processing system comprising: a plurality of data processor units; a plurality of data storage members, each of said data storage members adapted to store data words of a plurality of programs in the addressable storage cells thereof; the data words of said programs having symbolic addresses, each symbolic address representing the location of a cell in a storage member relative to a reference address common to all said programs; a data word transmission member for coupling at any one instant of time one processor to one data storage member; each processor unit being adapted to receive data words from said transmission member, to execute a plurality of different operations on received data words, and to transfer data words representing the results of said operations to a data storage member by said transmission member; one of said processor units being adapted to assign a set of storage cells of said storage members to each program to be stored in said storage members; one of said processor units storing programs in the set of storage cells assigned thereto; each program stored in the storage members having a unique identifier, so that for each symbolic address of a program and its identifier there is a corresponding storage cell, thereby establishing a topological relationship between the identifiers and symbolic addresses and the storage cells of said data storage members, said topological relationship varying as programs in the data storage members are replaced by others; each processor unit supplying the identifier signal representing the identifier of the program it is executing and a first signal group representing the symbolic address of a data word wheneven said processing unit is to transfer a data word between said processor unit and the storage members; an address translating device coupled to said processor units to receive an identifier signal and a first signal group and responsive thereto for generating a second signal group identifying the corresponding storage cell in accordance with the current topological relationship; and means for delivering said second signal group to the storage member in which the storage cell identified thereby is actually located; each storage member responsive to the receipt of a second signal group delivered to it, for transferring a data word between said addressed cell and said transmission member.

4. A data processing system comprising: a data processing unit; a data storage member; said data storage member adapted to store data words of a portion of at least one program in the addressable storage cells thereof, said cells being divided into blocks of contiguous cells; the data words of each of said portions of a program having symbolic addresses, each symbolic address comprising a first indicia group representing the address of a block of contiguous cells in the data storage member, and a second indicia group representing the relative location of a cell in a block, at least a first group being common to all portions of programs stored in the data storage member, a data word transmission member coupling said processing unit with said data storage member; said processing unit being adapted to receive data words from said transmission member, to execute a plurality of different operations on received data words, to transfer data words representing the results of said operation to said data storage member by said transmission member, and to assign at least one block of storage cells of said data storage member to each portion of a program to be stored in said storage member; means for storing portions of programs in the cells of the blocks of said cells assigned thereby; said system adapted to replace portions of programs by other portions of programs, each portion of a program stored in the storage member having a unique program identifier, there being an addressable storage cell for each program identifier and symbolic address of each portion of a program stored in said data storage member; said processing unit supplying an identifier signal representing the program identifier, a first signal group representing the first indicia group, and a second signal group representing the second indicia group whenever said processing unit is to transfer a data word between said processing unit and said storage member; said storage member responsive to the second signal group and to a third signal group, said third signal group representing the actual block address of one of the blocks of the storage member, for transferring a data word between said transmission member and the cell at the address corresponding to said second and third signal groups; an address translating device coupled to said processing unit to receive said identifier signal and said first signal group and responsive thereto for generating the corresponding third signal group; and means for transmitting said second signal group and said third signal group to said storage member.

5. A data processing system of claim 4 in which the number of cells in each block is the same.

6. A data processing system comprising: a plurality of data processors; a plurality of data storage members, said data storage members adapted to store data words of a plurality of portions of programs in the addressable storage cells thereof, the cells of said members being divided into blocks of contiguous cells, data words of each of said portions of programs having symbolic addresses, each symbolic address comprising a first subgroup representing the address of a block of contiguous cells, and a second subgroup representing the relative location of a cell in a block, a first subgroup of the symbolic address being common to all said portions of programs; a data word transmission member adapted to couple a processor with a data storage member; each processor being adapted to receive data words from said transmission member, to execute operations on received data words, to transfer data words representing the results of said operation to a data storage member by said transmission member; at least one of said processors being adapted to assign at least one unique block of storage cells of said data storage members to each portion of a program to be stored in said storage members; one of said processors for storing each portion of a program in the block of storage cells assigned to it; said system being adapted to replace portions of programs stored in said data storage member with other programs; each portion of a program stored in the storage members having a unique identifier indicia so that for each identifier indicia and symbolic address there is a corresponding addressable storage cell; each processing unit supplying a first signal group representing the identifier indicia of the program it is executing and the first and second subgroups of the symbolic address of a data word whenever the procesing unit is to transfer a data word between said procesing unit and one of said storage members; said storage members responsive to a second signal group comprising signals representing a third subgroup, said third subgroup being the address of one of the blocks of one of said members, and said second subgroup for transferring a data word between a cell at the address corresponding to said second signal group and said transmission member; an address translating device coupled to said processing unit and said storage member to receive said first signal group and responsive thereto for producing the corresponding second signal group; and means for transferring said second signal group to the storage member in which the cell whose address corresponds to said second signal group is located.

7. A data processing system of claim 6 in which the number of cells in each block is the same.

8. A data processing system comprising: a data processing unit; a data storage member having addressable storage cells, said cells being divided into blocks of contiguous cells, said data storage member adapted to store data words of a plurality of portions of programs in the cells thereof, the data words of each said portions of programs having symbolic addresses, each symbolic address comprising a symbolic block address representing a block of contiguous cells, and a symbolic word address representing the relative location of a cell in a block, the symbolic block address of at least one block being common to all said portions of programs; data word transmission member coupling said processing unit with said data storage member; said processing unit being adapted to receive data words from said transmission member to execute a plurality of different operations on received data words and to transfer data words representing the results of said operation to said data storage member by said transmission member; means for storing portions of programs in the data storage member, each portion being stored in at least one predetermined block of storage cells of said data storage member; the program portions stored in said storage member being replaceable by others; each portion of a program stored in the storage member having a unique program number so that for each program number and symbolic address of each program portion stored in said data storage member there is an addressable cell; said processing unit supplying a first signal representing the program number and the symbolic block address of a specific data word of a program stored in said data storage member wherever said processing unit is to transfer a data word between said processing unit and said storage member and supplying a second signal representing the symbolic word address; said storage member responsive to a third signal representing the actual block address of one of the blocks of the data storage member and said second signal for transferring a data word between a cell at the address corresponding thereto and said transmission member; an address translating device coupled to said processing unit and said storage member to receive said first signal and responsive thereto for generating a corresponding third signal; and means for transmitting said second and third signals to said storage member.

9. The data processing system of claim 8 in which the number of cells comprising a block is the same.

10. A data processing system comprising: a plurality of data processor units; a plurality of data storage members, each having addressable storage cells, said cells being divided into blocks of contiguous cells; each of said data storage members adapted to store data words of a plurality of programs in the cells thereof, the data words of each program having symbolic addresses, each symbolic address comprising a symbolic block address representing a block of contiguous cells and a symbolic word address representing the relative location of a cell in a block, at least one symbolic block address being common to all said portions of programs; a data word transmission member for coupling each processor with a data storage member; each processor being adapted to receive data words from said transmission member, to execute a plurality of different operations on received data words, and to transfer data words representing the results of said operation to a data storage member by said transmission member; one of said processor units adapted to assign at least one unique block of storage cells of said data storage members to each program to be stored in said storage member; one of said processor units storing the data word of programs in the blocks of storage cells assigned to each program; each program stored in said storage members having a unique program number, there being a corresponding addressable cell of said storage members for each program number and symbolic address of each program stored in said storage members at any given time, the relationship between program numbers and symbolic block numbers and the corresponding actual block of the storage members constituting a topological relationship; each processor unit supplying signals representing the program number and symbolic address whenever said processing unit is to transfer a data word between the processor and a storage member; each storage member responsive to an actual address signal comprising a signal representing an actual block address of one of the blocks of one of the storage members and a signal representing the symbolic word address for transferring a data word between said transmission member and a cell at the actual address corresponding thereto; an address translating device coupled to said processing unit and said storage member to receive signals representing the program number and the symbolic block address and responsive thereto for generating in accordance with the given topological relationship a signal designating one of said storage members and the actual block address of a block in said designated storage member corresponding to the program number and symbolic block number; and means for transmitting the actual block address signal and the symbolic word address signal to the one of said storage members designated.

11. The data processing system of claim 10 in which the number of cells comprising a block is the same.

12. In a data processing system having: a data processing unit; a data storage member having addressable storage cells, said cells being divided into blocks of contiguous cells; said data storage member adapted to store data words of a plurality of portions of programs in the cells thereof, the data words of each said portions of programs having symbolic addresses, each symbolic address comprising a symbolic block address representing a block of contiguous cells, and a symbolic word address representing the relative location of a cell in a block; a data word transmission member coupling said processing unit with said data storage member; said processing unit being adapted to receive data words from said transmission member, to execute a plurality of different operations on received data words, to transfer data words representing the results of said operation to said data storage member by said transmission member, and to assign one unique block of storage cells of said data storage member to each symbolic block address of each portion of a program to be stored in said storage member; means for storing portions of programs in the blocks of storage cells assigned thereto; each portion of a program stored in the storage member having a program number so that for each program number and symbolic block address there is a corresponding block of cells in said data storage member; said processing unit supplying a first signal representing the program number and the symbolic block address of a specific data word whenever said processing unit is to transfer a data word between said processing unit and said storage member, said processing unit also supplying a second signal representing the symbolic word address; said storage member responsive to a third signal representing the actual block address of one of the blocks of the data storage member and said second signal for transferring a data word between a cell at the address corresponding thereto and said transmission member, means for transmitting said second signal from said unit to said storage member, wherein the improvements comprise: an address translating device coupled to said processing unit to receive a first signal supplied by said unit, said translating device having a plurality of states, in any one of which states said translating device will produce in response to the receipt of a first signal a third signal; means for transmitting the third signal produced by said translating device to said storage member; and means for varying the states of said address translator so that the third signal produced in response to the receipt of a first signal corresponds to the actual block address assigned to each symbolic block address and program number of each portion of a program stored in said storage member.

13. In a data processing system having: a data processing unit; a data storage member having addressable storage cells, said cells being divided into blocks of contiguous cells; said data storage member adapted to store data words of a plurality of portions of programs in the cells thereof, the data words of each said portions of programs having symbolic addresses, each symbolic address comprising a symbolic block address representing a block of contiguous cells, and a symbolic word address representing the relative location of a cell block; a data word transmission member coupling said processing unit with said data storage member; said processing unit being adapted to receive data words from said transmission member, to execute a plurality of different operations on received data words, to transfer data words representing the results of said operation to said data storage member by said transmission member, and to assign one unique block of storage cells of said data storage member to each symbolic block address of each portion of a program to be stored in said storage member; means for storing portions of programs in the blocks of storage cells assigned thereto; each portion of a program stored in the storage member having a program number so that for each program number and symbolic block address there is a corresponding block of cells in said data storage member; said processin block of cells in said data storage member; said processing unit supplying a first signal representing the program number and the symbolic block address of a specific data word whenever said processing unit is to transfer a data word between said processing unit and said storage member, said processing unit also supplying a second signal representing the symbolic word address; said storage member responsive to a third signal representing the actual block address of one of the blocks of the data storage member and said second signal for transferring a data word between a cell at the address corresponding thereto and said transmission member, means for transmitting said second signal from said unit to said storage member, wherein the improvements comprise: an address translating device, said translating device comprising an associative memory, means for storing in said associative memory the first signal and third signal as portions of programs are stored in actual blocks of said storage member; said translating device being coupled to said processing unit to receive a first signal produced by said unit; said translating device in response to the receipt of each first signal producing the third signal stored with it; and means for transmitting the third signal produced by the translating device to said storage member.

References Cited

UNITED STATES PATENTS

| | | | |
|---|---|---|---|
| 3,079,594 | 2/1963 | Johnson ---------- | 340—174.1 |
| 3,323,108 | 5/1967 | Mullery et al. ------ | 340—172.5 |

RAULFE. B. ZACHE, Primary Examiner